UNITED STATES PATENT OFFICE 2,272,745

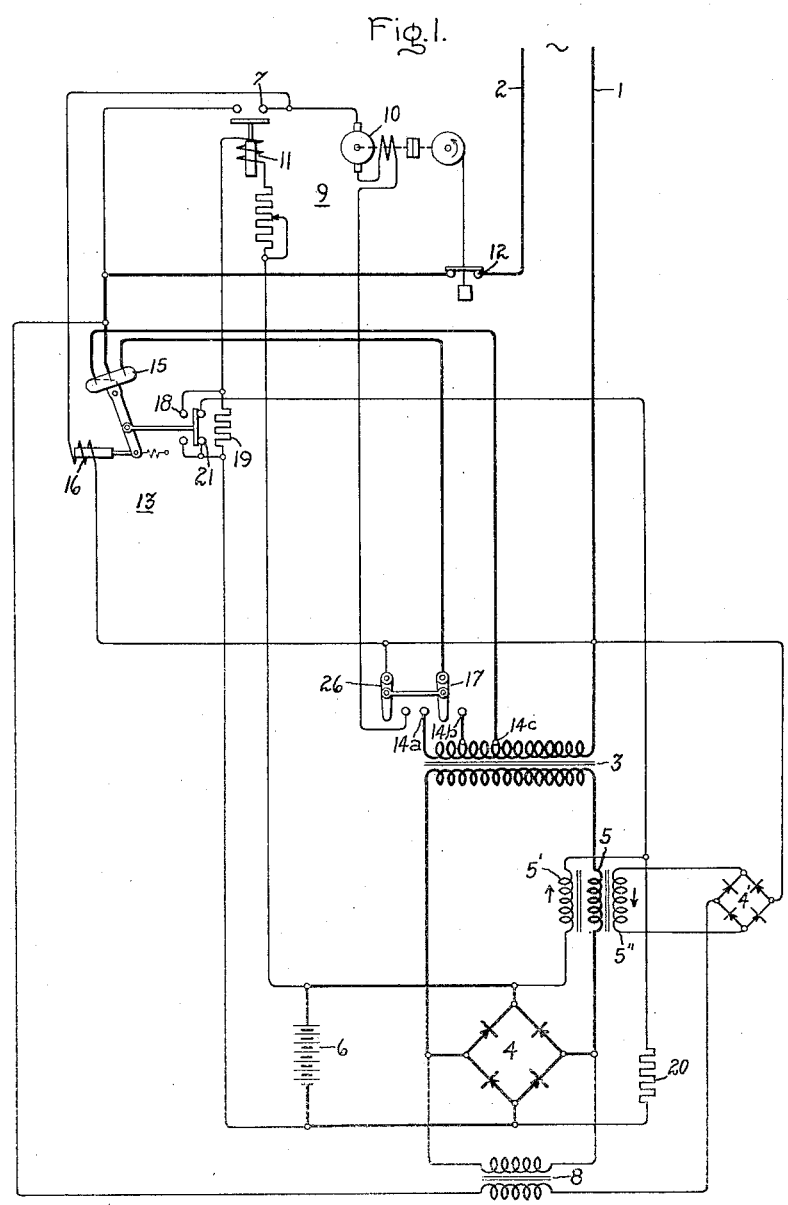

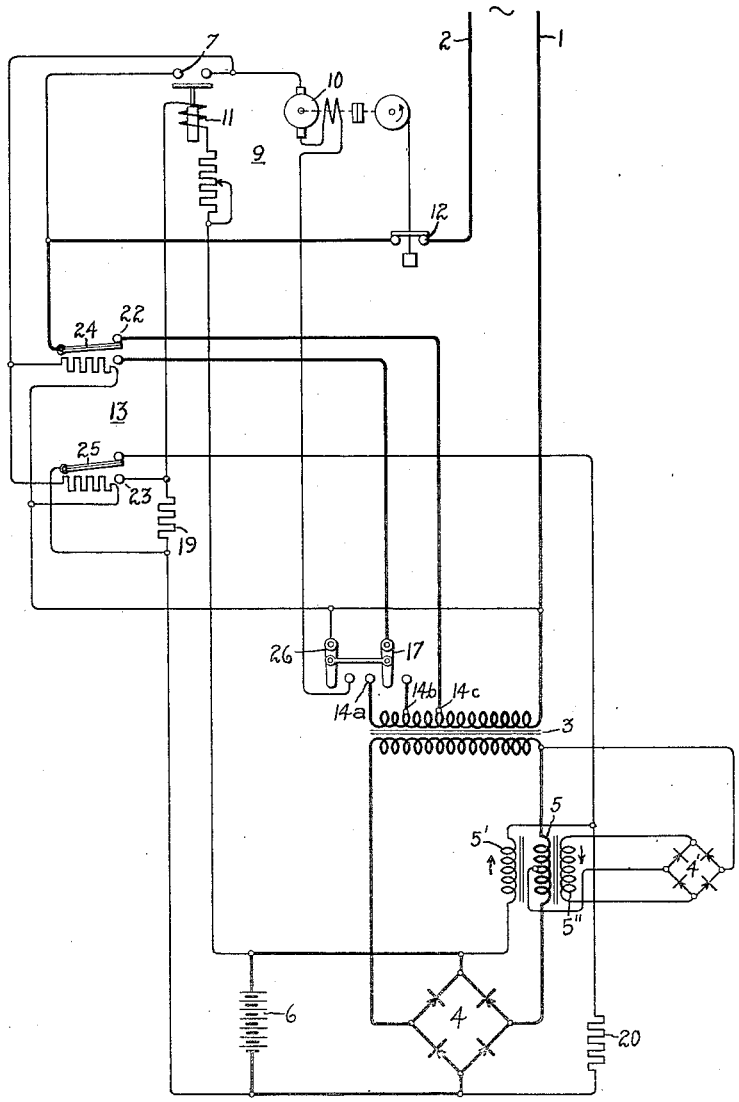

MEANS FOR CHARGING ELECTRIC BATTERIES

Richard S. Hinds and Arthur Mandl, Sheffield, England, assignors to General Electric Company, a corporation of New York Application August 4, 1939, Serial No. 288,342
In Great Britain February 22, 1939

8 Claims. (Cl. 171—314)

This invention relates to means for charging electric batteries with direct current derived from alternating current supply.

In the majority of battery charging equipments of this character, the conversion of the alternating current to direct current is effected by means of a rectifier, which is generally connected to the alternating current supply through the medium of a transformer under the control of a contactor or electrically operated switch whose operating coil is energized from the battery under charge in a circuit which includes contacts associated with an ampere hour meter whereby when the battery attains a fully charged condition, as detected by the ampere hour meter, the connection to the alternating current supply is interrupted and the charging cycle thereby terminated. These charging equipments do not operate entirely satisfactorily for various reasons. Thus, where the alternating current supply voltage is constant, as is customary, the rise of battery voltage during the charging process entails a gradual falling off, or in other words, a tapering characteristic of the direct current in the output circuit of the rectifier. Since the time normally available for charging is limited, this tapering characteristic further entails that the initial charging rate, and thereby the capacity of the rectifier, shall be relatively high; with such high initial charging rate and tapering current characteristic, the charging current at the point where the battery begins to "gas" is liable to be excessive and so give rise to the possibility for the shedding of activating material from the battery plates. Moreover, the method of relying upon the ampere hour meter for automatically terminating the charging cycle is unsatisfactory, in that the amount of overcharge is dependent upon the extent of discharge instead of being constant as is now agreed to be the more desirable by authorities in the art. Again, where the ampere hour meter is associated with a vehicle-carried battery any derangement of the ampere hour meter, due for instance to the severe conditions of service, may cause damage to the battery by the overcharging or undercharging which may be entailed. Furthermore, in the hitherto known charging equipments it is customary, in order to enable batteries to be given the desirable periodic "equalizing" or "conditioning" charge, to provide a manually operable switch which is required to be operated at the end of the normal charging process for effecting the appropriate adjustment of the transformer to reduce the output current of the charging equipment from the normal charging value to the desired "conditioning" charge value.

The present invention has for objects to provide improved battery charging equipments in which the foregoing disadvantages are removed and which preferably are entirely automatic in operation.

In the drawings, Fig. 1 illustrates diagrammatically an embodiment of the invention and Fig. 2 is a modification thereof.

Referring now to the drawings and more particularly to Fig. 1, our improved battery charging equipment derives charging current from an alternating current supply 1—2 through the medium of a transformer 3 and a rectifier system 4. The input circuit of the rectifier system includes a choke coil 5 whose inductance is adapted to be automatically regulated, in accordance with variations in the voltage of a battery 6 to be charged, in such manner that the magnitude of the charging current is maintained substantially constant with increase in the voltage of the battery during the charging process.

The choke coil 5 is so arranged that, when the charging process commences, its inductance is at maximum value and therefore absorbs a considerable part of the voltage supplied by the transformer 3 to the rectifier input circuit. The value of the inductance is gradually reduced, and the voltage supplied to the rectifier 4 thereby increased, as the charging process proceeds and the battery voltage accordingly increases. By utilizing the battery voltage for controlling the regulation of the choke coil inductance, and therefore the voltage supplied to the rectifier system, the size of the choke coil need only depend upon the value of the battery voltage.

The regulation of the choke coil inductance is preferably effected by variation of the direct current excitation of the choke coil core so as to vary the permeability.

The choke coil is wound on a core which is equipped with two saturating windings. One of these windings 5' is connected so as to be energized with direct current whose magnitude varies in accordance with the magnitude of the voltage in the output circuit of the rectifier system, that is, in accordance with the voltage of the battery which is connected to the output circuit during the charging process. The other winding 5" is connected so as to be energized with direct current whose magnitude varies in accordance with the difference between the alternating current line or supply voltage and the input voltage of the rectifier system. As shown, this winding is connected in the output circuit of an auxiliary rectifier system 4' whose input terminals are connected across the main alternating current supply in series circuit with the secondary winding of an auxiliary transformer 8 whose primary winding is connected in parallel with the input circuit of the main rectifier system 4 so that the input voltage of said main rectifier is rendered comparable with the main supply voltage.

With the saturating windings energized as described and arranged to act in opposition, their resultant excitations are proportioned to cancel each other at the beginning of the charging cycle. As the charging proceeds the excitation of the winding which is energized in accordance with the battery voltage predominates with the result that the saturation of the core increases and the inductance of the choke is thereby reduced so as to cause the appropriate adjustment of the alternating current voltage impressed across the input terminals of the main rectifier system.

As the winding 5" is energized in proportion to the difference between the voltage of the alternating current supply and the input voltage of the rectifier and as the only thing which causes variations in this voltage difference is the voltage drop in the variable reactance winding 5 of the reactor, it may also be said that the winding 5" is energized in proportion to the voltage drop across the variable reactance winding 5. Therefore, the reactor also automatically tends to maintain constant charging current with reasonable variations in supply voltage. Thus, if the supply voltage increases the charging current will increase faster than the battery voltage will increase due to the low resistance of a battery compared with its relatively high counter-voltage. This means that the voltage drop across the reactor will increase faster than the voltage of the battery and consequently the desaturating effect of the winding 5" will increase faster than the saturating effect of the winding 5' resulting in a net desaturating effect on the reactor, thereby increasing its reactance and tending to limit the rise in charging current. Conversely, a decrease in supply voltage will cause the desaturating effect of the winding 5' to decrease faster than the saturating effect of the winding 5', thereby producing a net saturating effect tending to reduce the reactance of the reactor and maintain the charging current substantially constant.

In a convenient form the saturated core choke coil may comprise a three-limbed core having the alternating current winding 5 provided on the two outer limbs whilst the direct current saturating windings 5' and 5" are wound on the inner limb, the arrangement being such that the two outer limbs only become saturated. With this arrangement, if the two parts of the alternating current winding carried on the outer limbs are connected in parallel, a strong damping effect may be produced to oppose the passage of alternating current flux through the center limb carrying the direct current windings with the result that said windings are protected against induced alternating current voltages which otherwise might be high where the number of turns is appreciable.

Another feature is that at that point in the battery charging cycle at which "gassing" of the battery occurs, the charging current is automatically reduced to a predetermined value, such, for instance, as that recommended by the battery manufacturers as the "finishing" value, and is maintained constant at such predetermined value for a definite period.

The point of the charging cycle at which "gassing" of the battery occurs may be detected by an electric relay means 9 responsive to the voltage of the battery to be charged. Advantageously the relay means, which may be conveniently referred to as the battery charge timing relay, may comprise a motor type relay 10 having its operating circuit controlled by contacts 7 associated with a voltage measuring element or coil 11 which in turn is connected across the terminals of the battery to be charged, so that, when during charge the voltage of the battery rises to the value sufficient to cause response of said voltage measuring element, the contacts 7 are closed and the motor 10 is initiated into operation. At the end of a predetermined period, as detected by the permitted travel of the motor 10, said motor is effective to open contacts 12 and thus cause disconnection of the main transformer from the supply so that the charging cycle is terminated. Preferably the voltage measuring element 11 and the associated contacts 7 of this relay are arranged to control the operation of another relay means 13 adapted to effect adjustment of the main transformer, as for instance by tappings 14a, 14b and 14c thereon, for changing the value of charging current and accordingly herein referred to as the current reducing relay.

The current reducing relay comprises an electrically operated mercury switch 15 whose operating coil 16 is connected in circuit with the contacts 7 associated with the voltage measuring element of the battery charge timing relay so that when said contacts are closed, thereby to cause operation of the timing motor, the operating coil of the current reducing relay is also energized. The switch contacts of this relay which are adapted to be bridged by the mercury are associated through a selector switch 17 with the tappings 14b and 14c on the primary winding of the main transformer. Thus, when the timing relay 9 and the current reducing relay 13 are operated, in response to a rise in the voltage of the battery to the "gassing" point, as detected by the voltage element 11 of the timing relay 9, the effective portion of the main transformer primary winding connected to the supply is increased and the output voltage of said transformer 3 thereby reduced, accordingly to reduce the charging current to the battery 6. By appropriate adjustment of the transformer tappings, the necessary reduction of the charging current to allow of the predetermined or "finishing" value of charging current may be obtained.

Advantageously, the operating coil 16 of the current reducing relay, in addition to its aforementioned functions, may be arranged, when energized, to cause closure of contacts 18 which are connected across a resistor 19 included in series with the voltage measuring element 11 of the battery charge timing relay 9. With this provision, the tendency for the contacts whose operation is controlled by the voltage measuring element 11 to "hunt," due to the sudden drop of battery voltage when the battery charging rate is decreased consequent upon the aforesaid adjustment of the main transformer tapping, may be prevented.

With a view to maintaining the charging current at the constant "finishing" value during the part of the charging cycle in which the battery 6 is "gassing," it is desirable that the inductance of the choke coil 5 should be at maximum value when this part of the charging cycle is commenced. However, in view of the provisions herein made for maintaining constant the charging current during the initial charging period, namely up to the "gassing" point of the cycle, the inductance of the choke coil 5 is low due to the highly saturated condition of its core produced by the direct current excitation thereof. Thus, according to a subsidiary feature of this invention a resistor 20 is included in series with that saturating winding 5' of the choke coil which is adapted to be energized in accordance with the battery voltage, and this resistor is controlled conveniently by contacts 21 associated with the operating coil of the current reducing relay 13 so that during the normal charging period, namely up to "gassing," the resistor is short-circuited, whereas when the "gassing" voltage is reached, and the current reducing relay thereby operated, the resistor is included in circuit with the said winding and the saturation of the choke coil core is thereby reduced accordingly to cause increase of the inductance to the appropriate value.

Provision is made for automatically reducing the charging current to a second predetermined value, such for instance as that recommended by the battery manufacturer as the "equalizing" or "conditioning" charge, at the end of the normal charging period. Conveniently this may be effected in the embodiment hereinbefore referred to by presetting the selector switch 17 associated with the timing and current reducing relays so that, when said relays are rendered effective to cause variation in the adjustment of the main supply transformer at the "gassing" point, the selected tapping 14a is such that the output voltage of said transformer is reduced appropriately to cause the reduction of the charging current to the said second predetermined value.

In Fig. 2 the auxiliary transformer 8 is dispensed with, and the voltage of the auxiliary rectifier system taken in parallel with a section of the choke coil, said choke coil being for this purpose tapped in such manner that the leakage of the tapped section becomes very high with increasing saturation and the direct current excitation is accordingly reduced.

In addition, the current reducing relay 13 comprises two single pole double-throw thermally operable switches 22 and 23 arranged with their operating elements, conveniently in the form of bimetallic members heated by resistance heaters 24 and 25, connected in parallel with one another in a circuit controlled by the contacts 7 associated with the voltage measuring element 11 of the battery charge timing relay 9. The one switch 22 controls the connection of the tappings of the main transformer to the supply circuit, as is effected by the mercury switch 15 in Fig. 1. The other switch 23 controls contacts connected across a resistor 19 included in series with the voltage measuring element 11 of the battery charge timing relay 9 and also contacts connected across a resistor 20 included in series with the saturating winding 5' of the choke coil which is adapted to be energized in accordance with the battery voltage, so that when the voltage measuring element 11 of the timing relay 9 is effective to operate its associated contacts 7 at the "gassing" point, the resistor 20 in circuit with the said saturating winding is open-circuited, thereby to cause reduction of the saturation of the choke coil core effected by said winding, for the purpose hereinbefore referred to, and at the same time the resistor 19 in circuit with the voltage measuring element is short-circuited, thereby to reduce the liability for the contacts 7 associated with said voltage measuring element 11 to "hunt."

Whereas it is contemplated in the embodiments of the invention herein described that the reduced charging current will be supplied to the battery after "gassing" for a definite predetermined period as determined by the permitted travel of the battery charge timing motor 10, it is also contemplated herein that the reduced "equalizing" or "conditioning" charge may be continued until such time as may be considered appropriate for the particular battery being charged. Accordingly, it is arranged herein to mechanically couple the selector switch 17 hereinbefore mentioned to a switch 26 controlling the operating circuit of the battery charge timing motor 10. With this arrangement, when the selector switch 17 is operated to complete the connection of a selected tapping 14b on the main transformer 3 to the supply for causing reduction of the output voltage of the transformer to give the higher predetermined reduced or "finishing" value in response to operation of the battery charge timing relay 9 and the current reducing relay 13 at the "gassing" point of the charging cycle, the aforementioned coupled switch 26 in the timing motor circuit is closed, whereas said switch is open, thereby to render the timing motor 10 ineffective, when said selector switch 17 is operated to complete the connection of the supply to a second tapping 14a for causing such reduction of the output voltage of the transformer as will give the lower predetermined or "equalizing" charge of the battery. The period during which such "equalizing" charge is continued may then be terminated under the control of a separate manually operable switch (not shown), conveniently in the supply circuit, which may be operated at such time as may be desired in any particular case.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. In a battery charging circuit of the type in which a serially-connected direct current saturable reactor controls the input current to a battery charging rectifier, the combination of a direct current saturating winding on said reactor connected to be energized in direct proportion to the battery voltage and an additional oppositely acting direct current saturating winding on said reactor connected to be energized in proportion to the voltage drop across said reactor, said windings being so proportioned as substantially to neutralize each other at the commencement of charging a discharged battery.

2. In a battery charging circuit of the type in which a serially-connected direct current saturable reactor controls the input current to a battery charging rectifier, the combination of a direct current saturating winding on said reactor connected to be energized in direct proportion to the battery voltage, and an additional oppositely acting direct current saturating winding on said reactor connected to be energized in proportion to the difference between the voltage of the alternating current supply and the input voltage to the rectifier, said windings being so proportioned as substantially to neutralize each other at the commencement of charging a discharged battery.

3. In a battery charging circuit of the type in which a serially-connected direct current saturable reactor controls the input current to a battery charging rectifier, the combination of a direct current saturating winding on said reactor connected to be energized in direct proportion to the battery voltage, and an additional oppositely acting direct current saturating winding on said reactor connected across a portion of said reactor through an auxiliary rectifier so as to be energized in proportion to the voltage drop across said reactor, said windings being so proportioned as substantially to neutralize each other at the commencement of charging a discharged battery.

4. In combination, a rectifier circuit for charging a storage battery, a saturable core reactor for controlling the current in said circuit, means including a direct current saturating winding on said reactor connected to be energized in proportion to the output voltage of said rectifier circuit for maintaining constant charging current with increases in battery voltage as charging progresses, means responsive to a predetermined high value of battery voltage for reducing the charging current, and means operated by said battery voltage responsive means when it reduces said charging rate for reducing the ratio of the current in said saturating winding to the output voltage of said rectifier so as to cause desaturation and permit resaturation of said reactor as charging continues at said reduced rate whereby constant charging current is maintained at said lower rate as the battery voltage increases.

5. In a battery charging system of the type which is provided with a voltage relay for automatically reducing the charging rate from a relatively high value when the battery voltage reaches a predetermined relatively high value, the combination with a time delay relay for terminating the charge a predetermined time after said time delay relay starts of a manually operable selector switch having a first position for making such connections that when said voltage relay reduces the charging rate to a finishing value it coincidentally starts said time delay relay and having a second position for making different connections such that said voltage relay reduces the charging rate to an equalizing value which is lower than said finishing value without starting said time delay relay whereby said equalizing rate continues indefinitely.

6. In a battery charging system of the type which is provided with a voltage relay for automatically reducing the charging rate from a relatively high value when the battery voltage reaches a predetermined relatively high value, the combination with a time delay relay for terminating the charge a predetermined time after said time delay relay starts of a manually operable selector switch having a first position for making such connections that when said voltage relay reduces the charging rate to a finishing value it coincidentally starts said time delay relay and having a second position for making different connections such that said voltage relay reduces the charging rate to an equalizing value which is lower than said finishing value without starting said time delay relay whereby said equalizing rate continues indefinitely, and means for maintaining each of said charging rates substantially constant irrespective of normal variations in battery voltage as charging progresses.

7. In combination, an alternating current supply circuit, a storage battery, a rectifier interconnecting said circuit and battery, a saturable reactor having a variable reactance winding connected to control the current in said rectifier, a direct current saturating winding on said reactor connected to be energized in proportion to the battery voltage, an oppositely acting direct current saturating winding on said reactor connected to be energized in proportion to the voltage drop across said variable reactance winding, means including a battery voltage responsive timing relay for reducing the battery charging rate when the battery voltage reaches a predetermined value, continuing charging at said reduced rate for a predetermined time and thereafter discontinuing further charging, and means including a manually operable switch for selectively causing said voltage responsive relay to reduce the charging rate to a still lower value when the battery voltage reaches said predetermined value and to continue charging at said still lower rate indefinitely.

8. In combination, an alternating current supply circuit, a storage battery, a rectifier interconnecting said circuit and battery, a saturable reactor having a variable reactance winding connected to control the current in said rectifier, a direct current saturating winding on said reactor connected to be energized in proportion to the battery voltage, an oppositely acting direct current saturating winding on said reactor connected to be energized in proportion to the voltage drop across said variable reactance winding, means including a battery voltage responsive timing relay for reducing the battery charging rate when the battery voltage reaches a predetermined value, continuing charging at said reduced rate for a predetermined time and thereafter discontinuing further charging, means including a manually operable switch for selectively causing said voltage responsive relay to reduce the charging rate to a still lower value when the battery voltage reaches said predetermined value and to continue charging at said still lower rate indefinitely, a normally short-circuited resistor connected in series with the direct current saturating winding which is energized in proportion to the battery voltage, a resistor connected in series with said voltage responsive relay, and means operated coincidentally with the operation of said voltage responsive relay for removing the short-circuit on the first mentioned resistor, and short-circuiting the second mentioned resistor.

RICHARD S. HINDS.
ARTHUR MANDL.